J. WALKER.
TIRE RETAINING DEMOUNTABLE RIM.
APPLICATION FILED OCT. 13, 1919.
1,345,522.
Patented July 6, 1920.
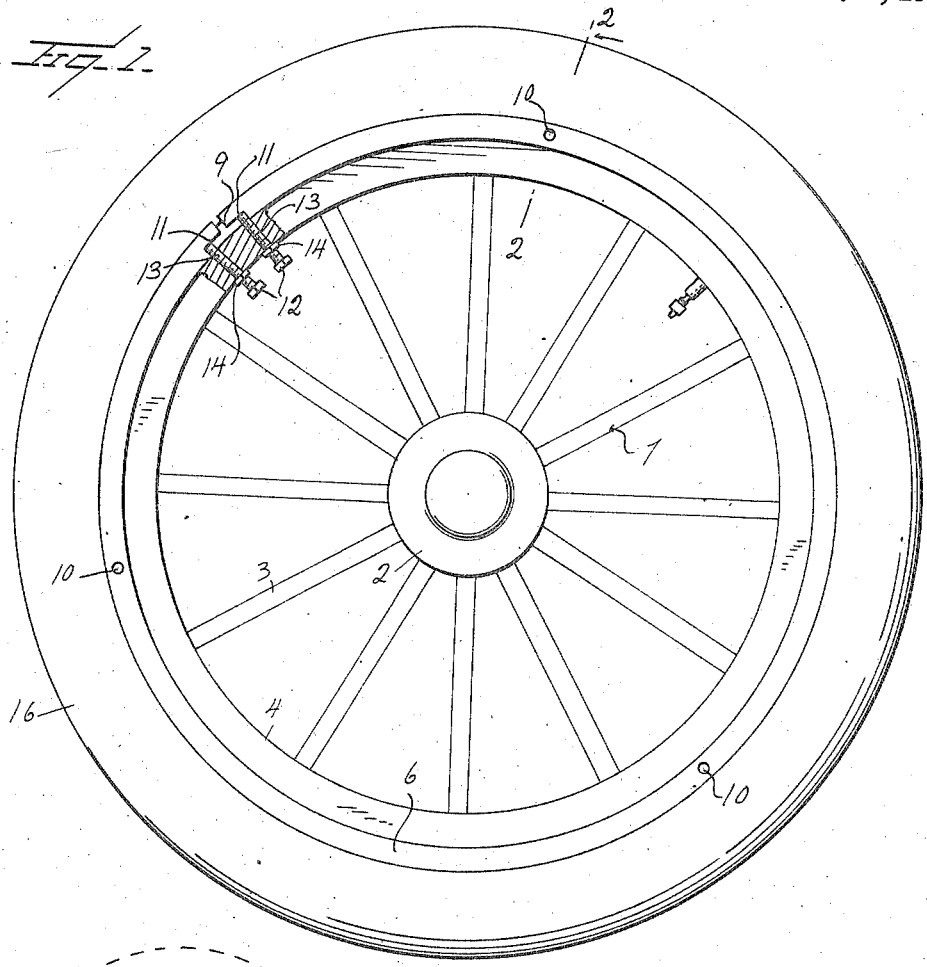
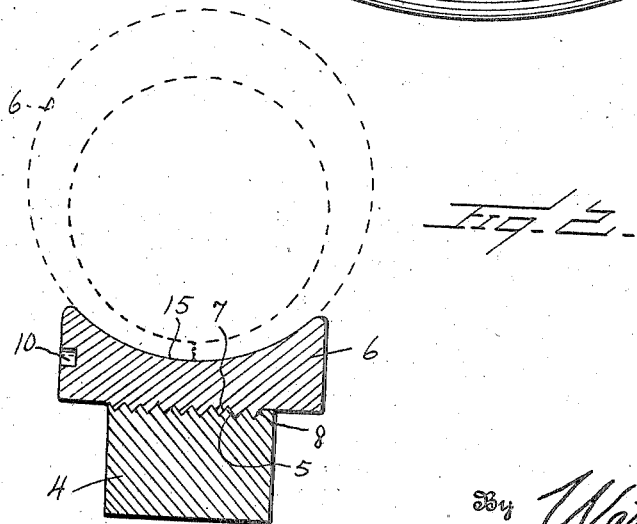
Inventor
J. Walker
By Watson E. Coleman
Attorney

UNITED STATES PATENT OFFICE.

JOSEPH WALKER, OF CANONSBURG, PENNSYLVANIA.

TIRE-RETAINING DEMOUNTABLE RIM.

1,345,522.  Specification of Letters Patent.  Patented July 6, 1920.

Application filed October 13, 1919. Serial No. 330,385.

*To all whom it may concern:*

Be it known that I, JOSEPH WALKER, a citizen of the United States, residing at Canonsburg, in the county of Washington and State of Pennsylvania, have invented certain new and useful Improvements in Tire-Retaining Demountable Rims, of which the following is a specification, reference being had to the accompanying drawings.

This invention relates to an improved tire retaining demountable rim, it being the aim of the present invention to provide a very simple, efficient and practical device of this kind, which is capable of being manufactured for a relatively low cost and sold at a reasonable profit.

Another object of the invention is to facilitate the retaining of the tire on the rim, and also to provide a rim, which is very easily applied to and removed from the felly of the wheel.

A further object of the invention is to provide means adjustably carried on the felly and designed to engage a part of the rim, to prevent movement of the rim relatively to the felly.

A still further object of the invention is to provide a split rim to be threaded upon the felly, and means adjacent the split ends of the rim to be engaged by the adjustable means carried by the felly for preventing movement of the rim relatively to the felly.

As an additional object of the invention it is the aim to construct the threaded connections between the rim and the felly opposite to the forward rotation of the wheel, in order to prevent the rim from unscrewing from the felly in case the means carried by the felly for preventing movement of the rim is not used, and also to provide means to limit the rim in its screwing action upon the felly.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a wheel, showing the improved tire retaining demountable rim as applied thereto.

Fig. 2 is a sectional view on line 2—2 of Fig. 1.

Referring more especially to the drawings, 1 designates a conventional form of wheel including a hub 2, spoke 3, and a felly 4, which is provided with threads 5.

A tire retaining and demountable rim 6 is mounted upon the felly, and has threads 7, whereby the rim may be screwed on the felly. At the terminals of the threads 5 of the felly 4 a shoulder 8 is formed, to limit the rim in its movement on the felly. It is the aim of the invention to construct the threaded connections 5 and 7 so that the rim may be screwed upon the felly in a direction opposite to the rotation of the wheel, so as to prevent the rim from unscrewing during the forward rolling or turning action of the wheel. In other words, by means of the forward rolling or turning action of the wheel, the rim is kept screwed tightly upon the felly, the shoulder 8 acting to limit the rim in its movement upon the felly.

The rim, in order to facilitate its screwing action on the felly of the wheel is split, as indicated at 9. When first applying the rim, it is necessary to spring or expand the rim slightly, so as to cause the threads to engage and take hold. In this way, the threads will remain tightly in engagement with the threads of the felly, but not too much, as to prevent a turning action of the rim, when screwing the rim on the felly. The rim at intervals on its outer side face is provided with a plurality of depressions 10, which may receive a suitable tool or instrument, so as to turn the rim, and facilitate the screwing of the rim on the felly. For instance, a spanner member may engage the depressions 10 to turn the rim home. Adjacent the ends of the rim where it is split, L-shaped recesses 11 are formed, and threaded through the felly, as shown clearly in Fig. 1 is a pair of bolts 12. These bolts are spaced, and their outer ends are designed to engage the end shoulders 13 of the recesses 11, to prevent movement of the rim, after it is applied upon the felly. Suitable lock nuts 14 are threaded upon the bolts, and in engagement with the inner face of the felly to prevent movement of the bolts, after they are screwed home. The rim is suitably channeled out as shown at 15, and engaging said channel is the usual tire 16 as shown in full lines in Fig. 1 and in dotted lines in Fig. 2. This tire 16 is of the usual construction and is designed to engage the usual inner tube (not shown). By means of the channel 15 of the rim, the tire is retained in position on the rim and the rim is held on the felly by virtue of the screw threads, the shoulder 8 and the retaining bolts 12.

The invention having been set forth, what is claimed as new and useful is:

In a tire retaining demountable rim, the combination with a felly having its outer cylindrical surface threaded concentric with the center of the wheel from one side face of the felly to the other, of a split rim, the inner cyindrical surface of which being threaded concentric with the wheel from one split end to the other and adapted to engage the threads of the felly, said split ends of the rim acting to permit the rim to expand when fitting the rim to the felly, whereby the spring action of the rim will cause a relative pressure of the rim on the felly, to insure partial contact between the connecting threads of the rim and the felly, the adjacent split ends of the rim having recesses of right angle or rectangular shape, the longer faces of the recesses being concentric with the rim, the shorter faces of the recesses constituting radial shoulders, said rim having channels for the reception of the tire, and radial bolts threaded through the felly and engaging the radial shoulders of said recesses to prevent excessive binding between the threaded connections to retain the rim in position on the felly against relative movement, the ends of the bolts engaging the longer faces of the recesses to additionally prevent binding between the threaded surfaces.

In testimony whereof I affix my signature.

JOSEPH WALKER.